US012668291B2

(12) United States Patent
Panfilov

(10) Patent No.: US 12,668,291 B2
(45) Date of Patent: Jun. 30, 2026

(54) WHEEL TACKLE

(71) Applicant: Dmitri Alexandrovich Panfilov,
Alexandria, VA (US)

(72) Inventor: Dmitri Alexandrovich Panfilov,
Alexandria, VA (US)

( * ) Notice: Subject to any disclaimer, the term of this patent is extended or adjusted under 35 U.S.C. 154(b) by 275 days.

(21) Appl. No.: 18/437,819

(22) Filed: Feb. 9, 2024

(65) Prior Publication Data

US 2025/0256751 A1     Aug. 14, 2025

(51) Int. Cl.
 B62B 5/00       (2006.01)
(52) U.S. Cl.
 CPC ...... B62B 5/0083 (2013.01); B62B 2205/006 (2013.01); B62B 2206/02 (2013.01)
(58) Field of Classification Search
 CPC ............ B62B 5/0083; B62B 2205/006; B62B 2206/02; B62B 5/0093
 See application file for complete search history.

(56) References Cited

U.S. PATENT DOCUMENTS

| | | | | |
|---|---|---|---|---|
| 6,241,276 B1 * | 6/2001 | Wilburn | .................... | B62B 1/20 |
| | | | | 280/659 |
| 6,357,063 B1 * | 3/2002 | Selby | .................... | A61G 1/0231 |
| | | | | 5/81.1 R |
| 6,634,658 B2 * | 10/2003 | Larouche | .............. | B62B 5/0083 |
| | | | | 414/458 |
| 7,025,363 B1 * | 4/2006 | Leight | ...................... | B62B 1/10 |
| | | | | 280/47.131 |

| | | | | |
|---|---|---|---|---|
| 7,111,851 B2 * | 9/2006 | Duncan | ................. | B62B 5/0083 |
| | | | | 301/128 |
| 7,516,502 B1 * | 4/2009 | Larson | .................... | B62B 5/026 |
| | | | | 280/47.131 |
| 7,516,503 B1 * | 4/2009 | Larson | ................. | A61G 1/0218 |
| | | | | 5/651 |
| 7,631,380 B1 * | 12/2009 | Larson | ................. | A61G 1/0231 |
| | | | | 280/47.131 |
| 8,100,430 B2 * | 1/2012 | Meyers | .................... | B62B 1/12 |
| | | | | 280/30 |
| 8,465,046 B2 * | 6/2013 | Meyers | .................... | B62B 1/12 |
| | | | | 280/30 |
| 8,505,959 B2 * | 8/2013 | Darling, III | ........... | B62B 13/18 |
| | | | | 280/651 |
| 9,663,130 B2 * | 5/2017 | Powwarynn | ............ | B62B 5/067 |
| 10,448,536 B2 * | 10/2019 | Dlugosz | ................... | B62B 1/10 |
| 10,633,009 B2 * | 4/2020 | Webber | ................. | B62B 5/0083 |
| 11,180,171 B1 * | 11/2021 | Suhling | .................... | B62B 5/06 |
| 11,505,226 B1 * | 11/2022 | Taranto | .................... | B62B 1/12 |

(Continued)

FOREIGN PATENT DOCUMENTS

| | | | | |
|---|---|---|---|---|
| KR | 102294671 B1 * | 8/2021 | ............. | B62B 5/065 |
| WO | WO-2018144753 A1 * | 8/2018 | ............... | B62B 1/12 |

*Primary Examiner* — James A Shriver, II
*Assistant Examiner* — Ian Bryce Shelton

(57)       ABSTRACT

Wheel tackle apparatus made of wheels with bearings and plywood angles with shackles impaled on a bolt and locked with nuts to a threaded bracket riveted to a metal angle. It provides an adjustable platform to accommodate variable object sizes. It has eyelets and threaded metal shackles which can be used to tie the object. The shackles serve as a barrier to prevent sliding, shifting, or detachment of the object. It can be disassembled for compact storage. It reliably secures an object for transportation onto the plywood and metal angle platform and enables rolling the object instead of hand carrying it.

5 Claims, 1 Drawing Sheet

(56)  References Cited

U.S. PATENT DOCUMENTS

| | | | |
|---|---|---|---|
| 2003/0071426 A1* | 4/2003 | Larouche | B62B 5/0083 |
| | | | 280/47.24 |
| 2004/0188963 A1* | 9/2004 | Gant | B62B 1/125 |
| | | | 280/47.24 |
| 2006/0006618 A1* | 1/2006 | Duncan | B62B 5/0083 |
| | | | 280/47.26 |
| 2009/0102147 A1* | 4/2009 | Moorhead | B25H 5/00 |
| | | | 280/32.6 |
| 2009/0212535 A1* | 8/2009 | Darling, III | B62B 13/18 |
| | | | 280/651 |
| 2012/0153587 A1* | 6/2012 | Ryan | B62B 1/12 |
| | | | 280/47.27 |
| 2012/0153710 A1* | 6/2012 | Ryan | B62B 1/125 |
| | | | 301/111.01 |
| 2015/0208780 A1* | 7/2015 | Avery | B62B 1/125 |
| | | | 280/652 |
| 2017/0106889 A1* | 4/2017 | Powwarynn | B62B 5/067 |
| 2018/0265108 A1* | 9/2018 | Parker | B62B 1/12 |
| 2019/0200477 A1* | 6/2019 | Dlugosz | A47B 91/002 |
| 2019/0217877 A1* | 7/2019 | Webber | B62B 5/068 |
| 2022/0185403 A1* | 6/2022 | Listro | B63C 13/00 |

* cited by examiner

WHEEL TACKLE

RELATED APPLICATIONS

The present application is a continuation of U.S. patent application Ser. No. 18/178,502, filed on Mar. 4, 2023 and entitled as "Trapezoidal nut".

BACKGROUND OF THE INVENTION

1. Field of the Invention

The present invention relates to a wheel tackle made of wheels with bearings and plywood angles with shackles impaled on a bolt and locked with nuts to a threaded bracket riveted to a metal angle.

2. Description of the Related Art

US 0133615 A for a Dumping-Cart and U.S. Pat. No. 6,966,574 B1 for a Multi-functional convertible transport cart have the ability to carry a cargo-load. However, they are too bulky, too heavy and are not designed to be disassembled into a smaller size for compact storage.

SUMMARY OF THE INVENTION

The purpose of the invention is to transport an object easily by rolling it on the wheel tackle apparatus. An object is placed onto the plywood and metal angle platform and secured with a rope or any flexible element to prevent it from sliding, shifting, and falling off from the wheel tackle during transportation.

The goal of the invention is to secure the object during transport and provide an adjustable platform to accommodate variable object sizes. This goal is achieved by the fact that the wheel tackle is designed with several eyelets which can be used to tie an object to and to hold it in a fixed and static position on the wheel tackle. Additionally, the threaded metal shackles can also be used to tie the object to them and serve as a barrier to protect the tied object from sliding off the wheel tackle during movement. Bolts and rectangular and bracket nuts allow the distance between the threaded metal shackles to be changed, so that the wheel tackle dimension can be adjusted to any object size. The wheel tackle apparatus is designed to be disassembled for compact storage when not in use.

The work result of this invention is that the wheel tackle apparatus reliably secures an object of different sizes, without unwanted sliding, shifting, or detachment onto the plywood and metal angle platform, and rolls the object instead of hand carrying it.

DETAILED DESCRIPTION OF THE INVENTION

Figure 1:
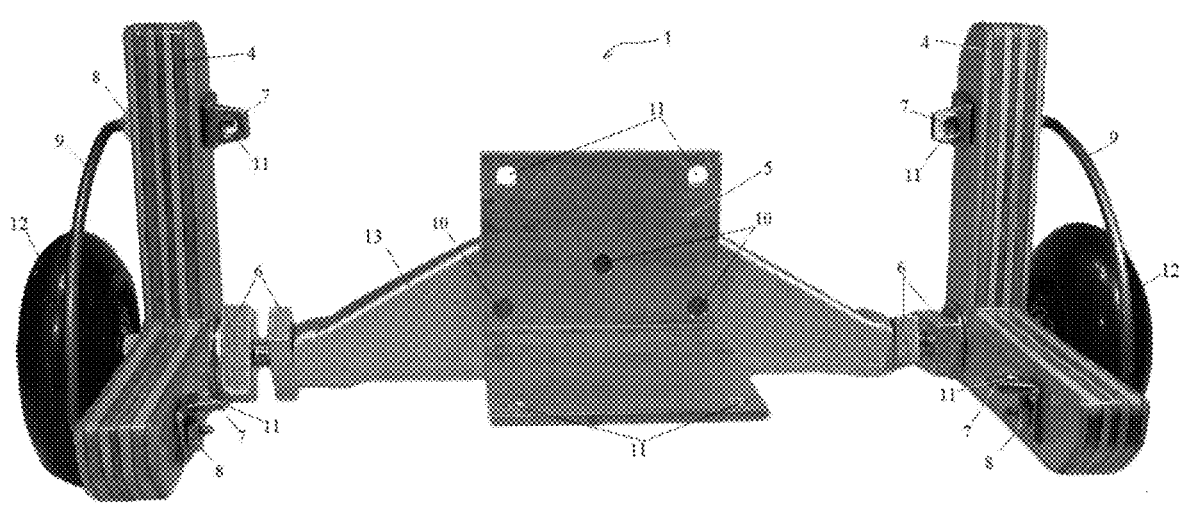
FIG. 1 is a wheel tackle in full assembly.

Referring to FIG. 1 is a perspective view of the wheel tackle 1 according to the invention. The wheel tackle 1 is comprised of several parts: central 2 and two sides 3. Side part 3 is comprised of plywood angle 4 with holes which are equipped with threaded metallic shackle 9 tightened with trapezoidal nut 7 and shackle locking nut 8 on one end and shackle washer 18 and shackle locking nut 8 on the other end to form a strong bond with plywood angle 4. Side part 3 also includes the wheel 12, bearings 17, bearing locking nuts 20, plywood angle' washers 21, and rectangular locking nut 6. Bearings 17 is put on bolt 19 and fixed by the bearing locking nuts 20 and is placed inside of the wheel 12. Plywood angle 4 with a hole is put on bolt 19 and fixed with plywood angle' washers 21 and rectangular locking nut 6. Metal angle 5 and trapezoidal nut 7 have eyelets 11. Side parts 3 elements are identical and interchangeable between each other.

Figure 2:
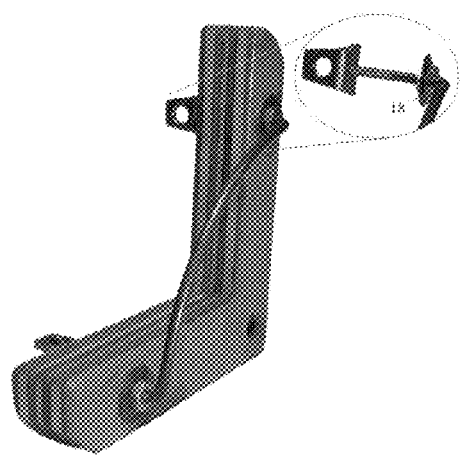
FIG. 2 is a plywood angle with a metal shackle, washers, trapezoidal and locking nuts assembly.

Referring to FIG. 2 is a perspective view of a plywood angle 4 assembly where in the round circle shows how the threaded segment of the threaded metal shackle 9, trapezoidal nut 7, shackle washer 18, and locking nuts 8 are positioned on the plywood surface and inside of the plywood angle 4 hole.

Figure 3:
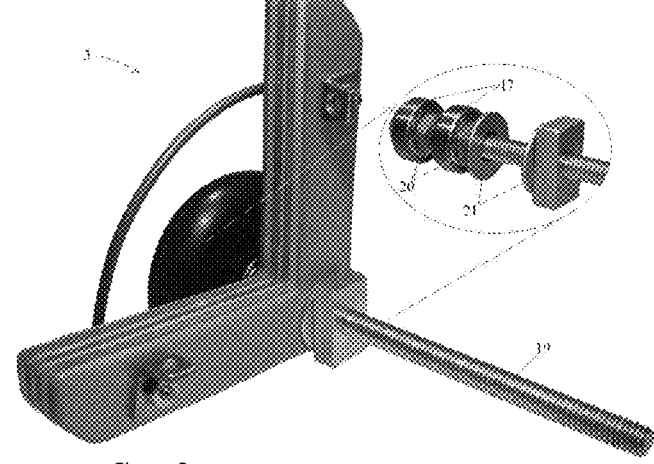
FIG. 3 is a plywood angle with wheel, nuts, bearings and bolt assembly.

Referring to FIG. 3 is a perspective view of a side part 3 assembly where in the round circle shows how the bearings 17 and bearing locking nuts 20 are positioned inside of wheel 12; and how plywood angle' washers 21 and rectangular locking nuts 6 are positioned on the plywood surface and inside of the plywood angle 4 hole.

Figure 4:
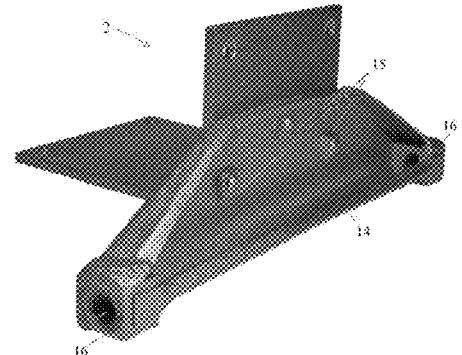
FIG. 4 is a central part presented from different point of view compare to FIG. 1.

Referring to FIG. 4 is central part 2 presented from a different point of view compared to FIG. 1. It is comprised of the threaded bracket 13, which is made from metal sheet bended and formed to accommodate bracket nuts 16 which is welded into it. Metal plank 14 is welded to bracket nuts 16. Metal angle 5 is riveted to a bracket with rivets 10 and washers 15 respectively. Bracket nut 16 has a threaded hole for bolt 19.

The proposed wheel tackle 1, after being adjusted to the object size by threaded bolts 19, bracket nuts 16, and rectangular locking nuts 6, is tied to the object by eyelets 11 and a rope or any flexible element to make ready for use (rolling).

A significant difference in the design of the wheel tackle 1 is that it can be disassembled by unscrewing the rectangular locking nuts 6 and occupy less volume than any other known wheeled carts. Wheel tackle 1 threaded elements can be extended with similar threaded custom elements. Shackle and angles size can be modified or replaced according to the customer needs as well.

This invention has been described as having a preferred design, but it can be further modified within the scope of technical abilities in the following way: eyelet 11 diameter in metal angle 5 and trapezoidal nut 7 can be any size, they can be accompanied by cutting a thread in it with any type, size, and pitch; bolt 19 and wheel 12 diameter can be any size. That is what and how this invention intended to cover any variations, uses, or adaptations of the invention using its general principles.

The invention claimed is:

1. A wheel tackle is comprised from several parts: a central and two sides; the central part is comprised of threaded bracket, which is made from metal sheet bended and formed to accommodate bracket nuts which is welded into; metal plank is welded to bracket nuts; metal angle is riveted to the threaded bracket with rivets and washers respectively; bracket nut has a threaded hole for bolt; the side part is comprised of plywood angle 4 with holes which are equipped with threaded metallic shackle tightened with trapezoidal nut and shackle locking nut on one end and shackle washer and shackle locking nut on the other end to form a strong bond with plywood angle; the side part also includes the wheel, bearings, bearing locking nuts, plywood angle' washers, and rectangular locking nut; the bearings is put on bolt and fixed by the bearing locking nuts and is placed inside of the wheel; plywood angle with a hole is put on bolt and fixed with plywood angle' washers and rectangular locking nut; metal angle and trapezoidal nut have eyelets.

2. The wheel tackle of claim 1, wherein a distance between two sides parts can be changed with a help of the bolts, bracket nuts, and rectangular locking nuts to accommodate the attachable object dimension.

3. The wheel tackle of claim 1, wherein the eyelets of the central part and two sides can be used to tie the object to them.

4. The wheel tackle of claim 1, wherein the threaded metal shackles can be used as a barrier to prevent the object from sliding, shifting, falling and as a place to tie the object to.

5. The wheel tackle of claim 1, wherein the side parts elements are identical and interchangeable between each other.

\*   \*   \*   \*   \*